Patented Apr. 12, 1932                                                1,854,100

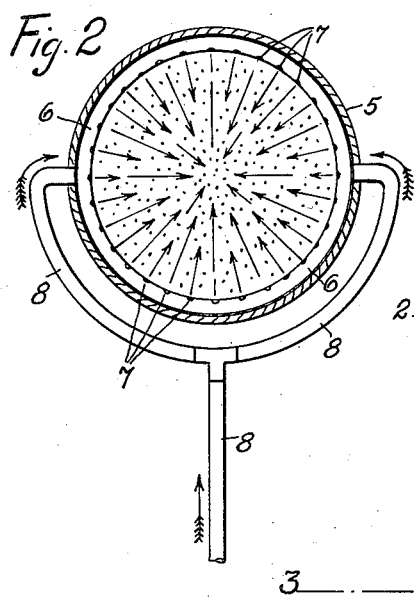
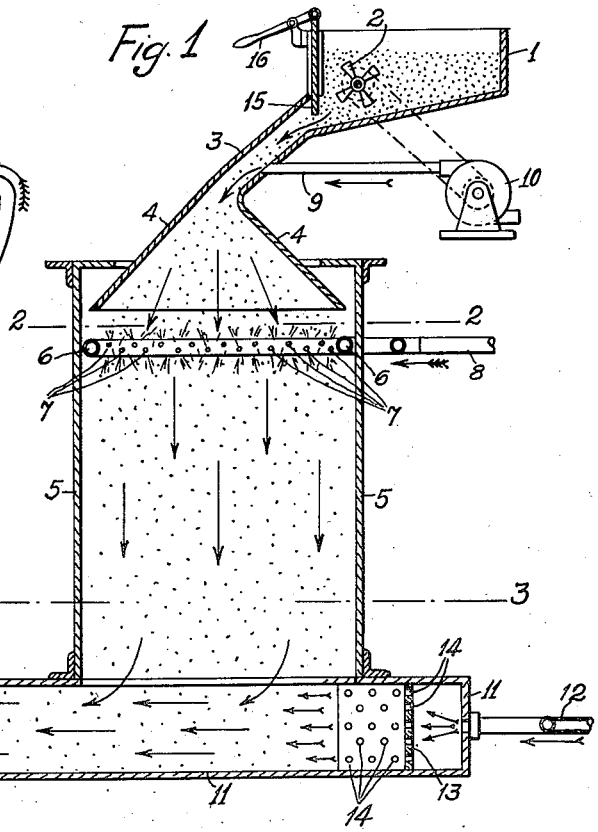
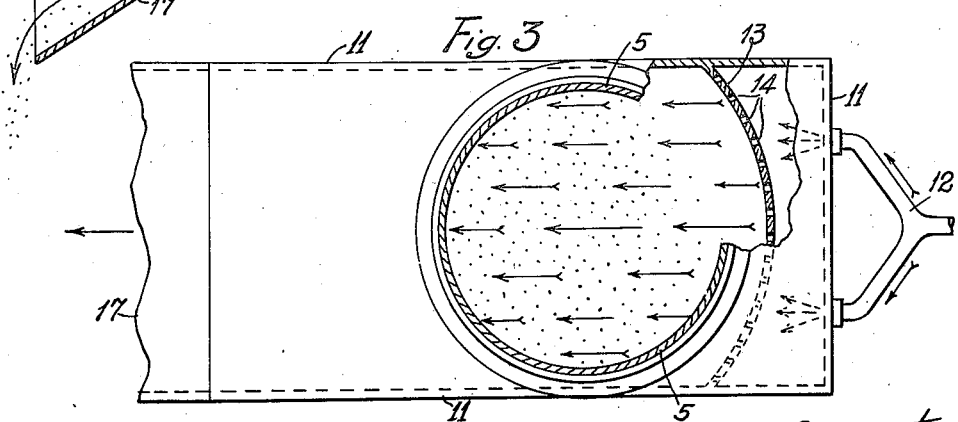

UNITED STATES PATENT OFFICE

AUGUSTO DIAZ BRITO, OF HABANA, CUBA

PROCESS OF PREPARING MATERIAL FOR PAVEMENTS

Application filed May 28, 1930, Serial No. 456,778, and in Cuba February 21, 1930.

This invention relates to the preparation of material for pavements, and has for its object to provide a process of preparing said material, by using a non-bituminous rock material which, as it is well known, must be impregnated with liquid bitumen, in order to obtain a predetermined material, which is definitely applied as a wearing surface for pavements.

In the preparation of material for pavements, the impregnation of the non-bituminous material with the bituminous material has heretofore been made very rudimentarily, without it having been obtained in a perfect way, the whole coating of each particle of non-bituminous material by the bitumen, such as is the essential principle in the wearing surfaces for pavements.

The process being the subject-matter of this invention, is precisely intended to secure said coating for each particle of non-bituminous material, and it essentially consists in spreading the non-bituminous material in a zone crossed in all radial directions by thin streams of liquid bitumen, so that all and every light particle may be impregnated by the liquid bitumen; cooling said particles when they are still in a spreaded condition, so that they may not adhere to each other at a temperature higher than the temperature of the liquid bitumen, and collecting all the free particles of material once they have been suitably cooled.

This process may be performed by means of several installations of apparatus, and in the accompanying drawing it is shown, only as an example, an apparatus plant for preparing the material for pavements, according to this invention, and in the same:

Fig. 1 is a diagrammatical section elevation view, showing a form of apparatus for performing the process subject-matter of this invention.

Fig. 2 is a horizontal section on line 2—2 of Fig. 1.

Fig. 3 is a horizontal section on line 3—3 of Fig. 1.

According to this invention, a non-bituminous material, previously ground, is fed into a hopper 1 in which is rotatorily mounted near its bottom a stirrer 2 which delivers the non-bituminous material to a slanting duct 3 ending in a large funnel 4 downwardly opened within the upper portion of a big cylindrical receptacle 5. On the inner side of the wall of this receptacle, and at a little distance below the edge of the funnel 4, is placed an annular tube 6 provided with hole rows 7, and which is supplied with liquid bituminous material through an outside pipe 8.

To the central portion of the slanting duct 3, is coupled a pressure air-feeding tube 9 which air is supplied by a fan 10 receiving its action from an engine (not shown), and which also provides the necessary power for driving the stirrer 2.

Beneath the opened bottom of the cylindrical receptacle 5 is placed a refrigerating chamber 11 supplied with cold air by an injector tube 12 coming from a refrigerating fan not shown, and which refrigerating air is distributed by an arched partition-wall 13 transversely arranged within the chamber 11 and near the end thereof to which the pipe 12 is coupled, and which partition-wall is provided with holes 14.

The operation of this apparatus is as follows: The non-bituminous material powder that is supplied to the hopper 1, passes into the slanting duct 3, it being possible to control the flow of it by means of a gate 15 arranged at one side of the hopper 1, and actioned by a lever 16, and upon said material passing through the slanting duct 3 it is forcefully spread in all directions into the funnel 4 and the receptacle 5 by means of the striking action of the air thrown by the fan 10 against one side of the wall of the slanting duct 3, which causes the air-draft to be repelled downward carrying along the particles of non-bituminous material in a free suspended condition, whereupon the result is that the material is spread across the space surrounded by the liquid bituminous material feeding tube 6, and as this space is crossed in all radial directions by thin streams of liquid bituminous material from the holes 7, all and every free particle of bituminous material being thrown across said space receive a coating of liquid bituminous material and become completely coated by same, in which hot condition, owing to the melting temperature of the liquid bituminous material, they would adhere to each other provided they were let to gather, but, upon the particles of non-bituminous material coated with liquid bituminous material drop into the chamber 11, they receive the refrigerating action of the cold air that is blown through the holes 14 of the partition-wall 13 and cooled in a free condition, and they are thrown already cooled towards the discharge channel 17 beneath which they are received into any suitable container.

The material obtained in such conditions may directly be applied as a wearing surface for pavements, and upon applying a roller to it, the particles will perfectly adhere to each other, thus constituting a most ideal wearing surface.

It is obvious that any construction of a device may be employed for performing the operations comprised in the process according to this invention, and that the refrigeration may be effected by any other means not being the air, for instance: circulating water in a suitable casing, etc.

What I claim is:

1. The process of preparing pavement material, consisting in comminuting non-bituminous solid material, diffusing such comminuted material by an air blast, directing sprayed melted liquid bituminous material across the current of said diffused comminuted non-bituminous solid material to cause said solid comminuted particles to be coated by said melted liquid bituminous material and cooling such coated material while the same is in motion.

2. The process of preparing pavement material, consisting in comminuting non-bituminous solid material, diffusing such comminuted material by an air blast, directing sprayed melted liquid bituminous material across the current of said diffused comminuted non-bituminous solid material to cause said solid comminuted particles to be coated by said melted liquid bituminous material and subjecting such coated material while in motion to the action of a cooling blast of air.

In witness whereof I affix my signature.

Dr. AUGUSTO DIAZ BRITO.